(12) United States Patent
Higuchi

(10) Patent No.: US 7,017,000 B2
(45) Date of Patent: Mar. 21, 2006

(54) DATA TRANSFER CONTROL CIRCUIT IN SYSTEM LSI

(75) Inventor: Ryohei Higuchi, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 194 days.

(21) Appl. No.: 10/679,279

(22) Filed: Oct. 7, 2003

(65) Prior Publication Data

US 2004/0205277 A1    Oct. 14, 2004

(30) Foreign Application Priority Data

Apr. 11, 2003    (JP)    ............................. 2003-107949

(51) Int. Cl.
 *G06F 13/14*    (2006.01)

(52) U.S. Cl. .................... 710/305; 710/3; 710/306; 710/52; 711/158

(58) Field of Classification Search .................. 710/3, 710/52, 53, 305, 303, 306; 711/158

See application file for complete search history.

(56) References Cited

U.S. PATENT DOCUMENTS

| 5,007,011 | A | * | 4/1991 | Murayama ................. 711/213 |
| 6,298,424 | B1 | | 10/2001 | Lewchuk et al. |
| 6,880,046 | B1 | * | 4/2005 | Yokoi et al. ................ 711/137 |
| 6,892,262 | B1 | * | 5/2005 | Taki ........................... 710/300 |

FOREIGN PATENT DOCUMENTS

| JP | 7-210454 | 8/1995 |
| JP | 2001-229074 | 8/2001 |

* cited by examiner

*Primary Examiner*—Tim Vo
*Assistant Examiner*—Brian Misiura
(74) *Attorney, Agent, or Firm*—Buchanan Ingersoll PC

(57) ABSTRACT

Two bus masters share an external device. One particular bus master has an arrangement for issuing a data pre-read instruction, at the time of issuing a data read request. Upon reception of the data read request accompanying with the data pre-read instruction issued by the particular bus master, an external device controller instructs an external address generator to continuously generate an address for performing normal readout this time, and an address for the next pre-read, and executes readout by the next pre-read address, provided that when the normal readout this time is finished, the bus master has not issued a data read request. The normal data read based on the normal readout address this time is held in a data holder, and the pre-read data read based on the next pre-read address is stored in a pre-read data storage.

7 Claims, 11 Drawing Sheets

FIG.2

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| MASTER BUS | | | | | | | | | | | | | | | | |
| REQ | R0 | | | | | | | R1 | | | | | | | | |
| ACK | R0 | | | | | | | R1 | | | | | | | | |
| END | | | | | | R0 | | | R1 | | | | | | | |
| RW | "read" | | | | | | | "read" | | | | | | | | |
| MADDR | R0 | | | | | | | R1 | | | | | | | | |
| MDR_E | | | | | | R0 | | | R1 | | | | | | | |
| MDW | | | | | | | | | | | | | | | | |
| E BUS | | | | | | | | | | | | | | | | |
| EREQ | R1 | | | | | | | R1 | | | | | | | | |
| EEND | | | | | | R1 | | | R1 | | | | | | | |
| ERW | "read" | | | | | | | "read" | | | | | | | | |
| DATA PRE-READ INSTRUCTION | ⊓ | | | | | | | ⊓ | | | | | | | | |
| EADDR | R0 | | | | | | | R1 | | | | | | | | |
| EDR | | | | | | R0 | | | R1 | | | | | | | |
| MDW | | | | | | | | | | | | | | | | |
| READ DATA SWITCH | | | | | | | | | ⊔ | | | | | | | |
| | | | | | | R0 | | | | | | | | | | |
| PRE-READ BUFFER | | | | | | R1 | | | | R2 | | | | | | |
| EXTERNAL BUS | | | | | | | | | | | | | | | | |
| CONTROL SIGNAL-SDRAM COMMAND | AC | NP | RD | RD | NP | NP | NP | RD | NP | NP | NP | NP | NP | NP | NP | |
| ADDRESS | R0 | | C0 | C1 | | | | | | | | | | | | |
| DATA | | | | | R0 | R1 | | | | R2 | | | | | | |

AC: LINE ACTIVATION COMMAND
NP: NOP COMMAND
RD: READ COMMAND

AC: LINE ACTIVATION COMMAND
NP: NOP COMMAND
RD: READ COMMAND
PR: BANK DEACTIVATION COMMAND

DATA TRANSFER CONTROL CIRCUIT IN SYSTEM LSI

BACKGROUND OF THE INVENTION

1) Field of the Invention

The present invention relates to a data transfer control circuit in a system LSI (large-scale Integration).

2) Description of the Related Art

Japanese Patent Application Laid-Open No. 2001-229074 (0019–0023, FIG. 1) discloses an example of a data transfer control circuit in a system LSI. FIG. 10 is a block diagram of the data transfer control circuit disclosed in this publication.

The data transfer control circuit includes two bus masters, bus master-A 901 and bus master-B 902. The bus master-A 901 controls a master bus-A 903a, and the bus master-B 902 controls a master bus-B. 903b, to access a CPU (Central Processing Unit) (not shown) or the like connected to the master bus-A 903a and the master bus-B 903b, or an external device 911 that is a device outside of the LSI.

The master bus-A 903a and the master bus-B 903b have the same configuration. For example, the master bus-A 903a has an address signal bus 931 from which an address signal MADDR is transmitted, a control signal bus 932 from which a control signal is transmitted, a write data signal bus 933 from which data to be written by the bus master (hereinafter, "write data") MDW is transmitted, and a read data signal bus 934 from which data read out from the external device 911 by the bus master (hereinafter, "read data") MDR_E is transmitted.

A bus interface section 904 is connected to the master bus-A 903a and the master bus-B 903b. The bus interface section 904 performs conversion of a protocol of the master bus-A 903a and the master bus-B 903b when the bus master-B 902 accesses the external device 911 to a protocol of the external device 911.

Data holders 906 and 908, a data buffer 907, an external device controller 909, and an external address generator 910 are connected between the bus interface section 904 and the external device 911. The external address generator 910 is connected to the bus interface section 904 via an address signal bus 951, and also connected to the external device 911 via an address signal bus 961. The external device controller 909 is connected to the bus interface section 904 via a control signal bus 952, and also connected to the external device 911 via a control signal bus 962.

A read data output terminal of the data holder 908 is connected to the bus interface section 904 via a read data signal bus 953, and a read data input terminal is connected to a read data output terminal of the data buffer 907. A write data input terminal of the data holder 906 is connected to the bus interface section 904 via a write data signal bus 954, and a write data output terminal is connected to a write data input terminal of the data buffer 907. The read and write data input/output terminal of the data buffer 907 is connected to the external device 911 via a data signal bus 963.

The external device 911 is, for example, an SDRAM (Synchronous Dynamic Random Access Memory). The external address generator 910 generates an address signal of the external device 911 under control of the external device controller 909. The data buffer 907 fetches a write data signal held by the data holder 906 and outputs the signal to the external device 911 under control of the external device controller 909, and also fetches a read data signal output by the external device 911 and allows the signal to be held by the data holder 908.

The data read operation by the bus master-A 901 from the external device 911 will now be explained. The explanation of the data write operation for writing the data in the external device is omitted.

The whole of the address signal bus 951 through which an address signal EADDR is transmitted, the control signal bus 952 through which a control signal is transmitted, the read data signal bus 953 through which a read data signal EDR is transmitted, and the write data signal bus 954 through which a write data signal EDW is transmitted is referred to as an E bus 905. The signals transmitted to the respective buses are specified by using names of E bus address signal, E bus control signal, and E bus read signal, respectively.

The whole of the address signal bus 961 between the external address generator 910 and the external device 911, the control signal bus 962 between the external device controller 909 and the external device 911, and the data signal bus 963 between the data buffer 907 and the external device 911 is referred to as an external bus. The signals transmitted to the respective buses are specified by using names of an external bus address signal, an external bus control signal, and external bus read data signal.

The bus master-A 901 outputs a control signal necessary for performing data read to the control signal bus 932, and at the same time, also outputs the address signal MADDR of the external device 911 to be read to the address signal bus 931.

When the control signal for data read is output to the control signal bus 932, the bus interface section 904 confirms whether the address signal MADDR on the address signal bus 931 is the address signal to the external device 911. In this example, the address signal MADDR on the address signal bus 931 is an address signal to the external device 911, and hence the bus interface section 904 performs read operation of the external device 911 with respect to the E bus 905.

That is, the bus interface section 904 outputs the E bus control signal necessary for reading the external device 911 to the control signal bus 952, and at the same time, also outputs the E bus address signal EADDR for accessing the external device 911 to the address signal bus 951.

The external device controller 909 receives the E bus control signal from the control signal bus 952, generates an external bus control signal necessary for accessing the external device 911, and outputs the signal to the external device 911, and at the same time, also instructs the external device generator 910 to generate an address. Further, the external device controller 909 instructs the data buffer 907 to fetch the external bus read data signal.

When having received the E bus address signal EADDR from the bus interface section 904 in accordance with the instruction from the external device controller 909, the external address generator 910 generates an external bus address signal necessary for accessing the external device 911, and outputs the signal to the external device 911.

As a result, the external device 911 performs data read, using the external bus control signal and the external bus address signal. The external bus read data signal output by the external device 911 is input to the data holder 908 via the data buffer 907, temporarily held therein, transmitted as the E bus read data signal EDR to the read data signal bus 953 of the E bus 904, and as the read data signal MDR_E to the read data signal bus 934 in the master bus-A 903a through the bus interface section 904, and fetched by the bus master-A 901.

The timing of the data read operation is explained next, with reference to FIG. 11. FIG. 11 is a timing chart that explains the timing relation at the time of data read operation performed by the conventional data transfer control circuit. It is assumed that the external device 911 is the SDRAM.

FIG. 11 illustrates the items for the master bus, the E bus, and the external bus separately. The signals on the master bus include REQ, ACK, END, RW, MADDR, MDR_E, and MDW. REQ, ACK, END, and RW are the control signals to be transmitted onto the control signal bus 932. REQ is a bus access request signal, ACK is a bus access permission signal, END is a bus access end signal, and RW is a read/write signal. The other signals MADDR, MDR_E, and MDW have already been described above.

The signals on the E bus include EREQ, EEND, ERW, EADDR, EDR, and EDW. EREQ, EEND, and ERW are the E bus control signals to be transmitted onto the control signal bus 952. EREQ is an E bus access request signal, EEND is a bus access end signal, and ERW is an E bus read/write signal. The other signals EADDR, EDR, and EDW have already been described above.

The signals on the external bus include the control signal, address signal, and data signal. The external bus control signal includes a line activation command AC, an NOP (No-operation) command NP, a read command RD, and a bank deactivation command PR, and the SDRAM command is defined by the combination of these commands.

Referring to FIG. 11, at clock cycle "1", the bus master-A 901 outputs the bus access request signal REQ "R0" to the master bus-A 903a, confirms the bus access permission signal ACK "R0", and outputs the read/write signal RW and the address signal MADDR "R0". To the read/write signal RW, a value "read" indicating that the bus access is the read access is output.

When the bus access request signal REQ "R0" is output, the bus interface section 904 reads the address signal MADDR "R0" to judge that it is an address with respect to the external device 911, and outputs the bus access permission signal ACK "R0" to the master bus-A 903a.

The bus interface section 904 outputs the E bus access request signal EREQ "R1", the E bus read/write ERW signal, and the E bus address signal EADDR "R0" to the E bus 905. To the E bus read/write signal ERW, a value "read" indicating that the E bus access is the read access is output.

The external device controller 909 receives the E bus access request signal EREQ "R1" from the bus interface section 904, and outputs a line activation command AC, an NOP command NP, a read command RD, and a bank deactivation command PR that are the external bus control signals necessary for accessing the SDRAM, in this order to the external device 911, synchronously to the respective clocks of clock cycles "1" to "5".

The external address generator 910 receives the E bus address signal EADDR "R0" from the bus interface section 904, and outputs the external bus address signal necessary for accessing the SDRAM to the external device 911. In this case, the external address generator 910 time-divides the address into a row address "R0" and a column address "C0" and outputs these addresses. Specifically, the external address generator 910 generates the row address "R0" and the column address "C0" from the E bus address signal EADDR according to the external address generation instruction received from the external device controller 909. Then, the external address generator 910 outputs the row address "R0" at clock cycle "1" and the column address "C0" at clock cycle "3".

Since it is assumed here that the CAS latency (Column Address Strobe Latency) of the SDRAM is two clocks, the read data signal "R0" read from the SDRAM at clock cycle "5" is input to the data buffer 907. The read data signal "R0" input to the data buffer 907 is taken into the data holder 908 under control of the external device controller 909 and temporarily held therein, and then output to the read data signal bus 953 of the E bus 905, as the E bus read data signal EDR "R0" at clock cycle "6". The E bus read data signal EDR "R0" is output to the read data signal bus 934 of the master bus-A 903a as the read data signal MDR_E "R0" at the same clock cycle "6" through the bus interface section 904.

At this time, the bus interface section 904 outputs the bus access end signal END "R0" to the control signal bus 932 in the master bus-A 903a at the same clock cycle "6". The bus master-A 901 reads this bus access end signal END "R0", and fetches the read data signal MDR_E "R0" from the read data signal bus 934 in the master bus-A 903a. The bus interface section 904 outputs the E bus access end signal EEND "R1" to the external device controller 909 at the same clock cycle "6".

With the second bus access, the external device controller 909 receives the E bus access request signal EREQ "R1" from the bus interface section 904, and outputs the line activation command AC, the NOP command NP, the read command RD, and the bank deactivation command PR that are the external bus control signals, to the external device 911 in this order, synchronously to the respective clocks of clock cycles "8" to "12". Then, the external device controller 909 performs end processing at clock cycle "13".

In this manner, in the conventional data transfer control circuit, the first bus access (SDRAM access) is performed, requiring six clock cycles (clock cycle "1" to "6"). The second bus access is performed in the same procedure, requiring six clock cycles (clock cycle "8" to "12").

However, in the data transfer control circuit in the conventional system LSI, when accessing the external device, for example, an SDRAM, even when intermittently accessing continuous areas, the SDRAM must be deactivated temporarily, thereby causing a problem in that the bus use efficiency is bad.

Further, since the SDRAM is accessed every time there is a request from the bus master, if accesses concentrate, the bus bandwidth is not enough, thereby causing a problem in that the data transfer efficiency drops.

SUMMARY OF THE INVENTION

It is an object of the present invention to solve at least the problems in the conventional technology.

A data transfer control circuit, according to one aspect of the present invention, in a system large-scale integration controls data transfer when a plurality of bus masters access a commonly shared external device. At least one bus master of the bus masters has an arrangement for instructing pre-read of data, at the time of issuing a data read request. The data transfer control the circuit includes an external address generation unit that receives an address generation instruction and generates an address signal of the external device based on an address signal issued by the one bus master; an external device control unit that makes the external address generation unit to continuously generate an address for normal readout this time and an address for the next pre-read, upon reception of the data read request accompanied with the data pre-read instruction issued by the one bus master, and executes readout based on the next pre-read address, provided that when the normal readout this time is finished, the bus master other than the one bus master has not issued a data read request; a data holding unit that holds the normal data read based on the normal readout address this time; and a pre-read data storage unit that stores the pre-read data read based on the next pre-read address.

A data transfer control circuit, according to another aspect of the present invention, in a system large-scale integration controls data transfer when a plurality of bus masters access a commonly shared external device. The data transfer control circuit includes an instruction signal generation unit that generates a data pre-read instruction signal, when an address signal issued by one of the bus masters includes an address determined to be pre-read; an external address generation unit that receives an address generation instruction and generates an address signal of the external device based on the address signal; an external device control unit that generates the address generation instruction so that the external address generation unit continuously generates an address for performing normal readout this time and an address for performing pre-read for the next time, when the data read request issued by the one bus master is accompanied with the generation of the data pre-read instruction signal, and executes readout based on the next pre-read address, provided that bus master other than the one bus master has not issued a data read request, when the normal readout this time is finished; a data holding unit that holds the normal data read based on the normal readout address this time; and a pre-read data storage unit that stores the pre-read data read based on the next pre-read address.

A data transfer control circuit, according to still another aspect of the present invention, in a system large-scale integration controls data transfer when a plurality of bus masters access a commonly shared external device. The data transfer control circuit includes an external address generation unit that receives an address generation instruction and generates an address signal of the external device based on the address signal; an external device control unit that generates the address generation instruction so that the external address generation unit sequentially generates a plurality of addresses for performing pre-read in addition to the address for performing the normal readout, when it judges to execute pre-read of data, upon reception of the data read request issued by the one bus master, sequentially executes readout by the pre-read addresses provided that bus master other than the one bus master has not issued a data read request, and executes readout by the normal readout address upon reception of the normal readout instruction; and a pre-read data registration unit that registers the pre-read data read by the pre-read addresses identifiably by the address identifiers, and judges whether there is one of the address identifiers that agrees with the address in the address signal accompanying the data read request issued by the one bus master, and when there is one address that this condition, transmits the corresponding registered pre-read data to the one bus master as the readout data this time, and when there is no address that agrees this condition, generates the normal readout instruction to transmit the read normal data to the one bus master as the readout data this time.

The other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 2 is a timing chart of data read operation performed in the data transfer control circuit according to the first embodiment;

DETAILED DESCRIPTIONS

Exemplary embodiments of the data transfer control circuit in a system LSI according to the present invention are explained in detail below while referring to the accompanying drawings.

Figure 1:
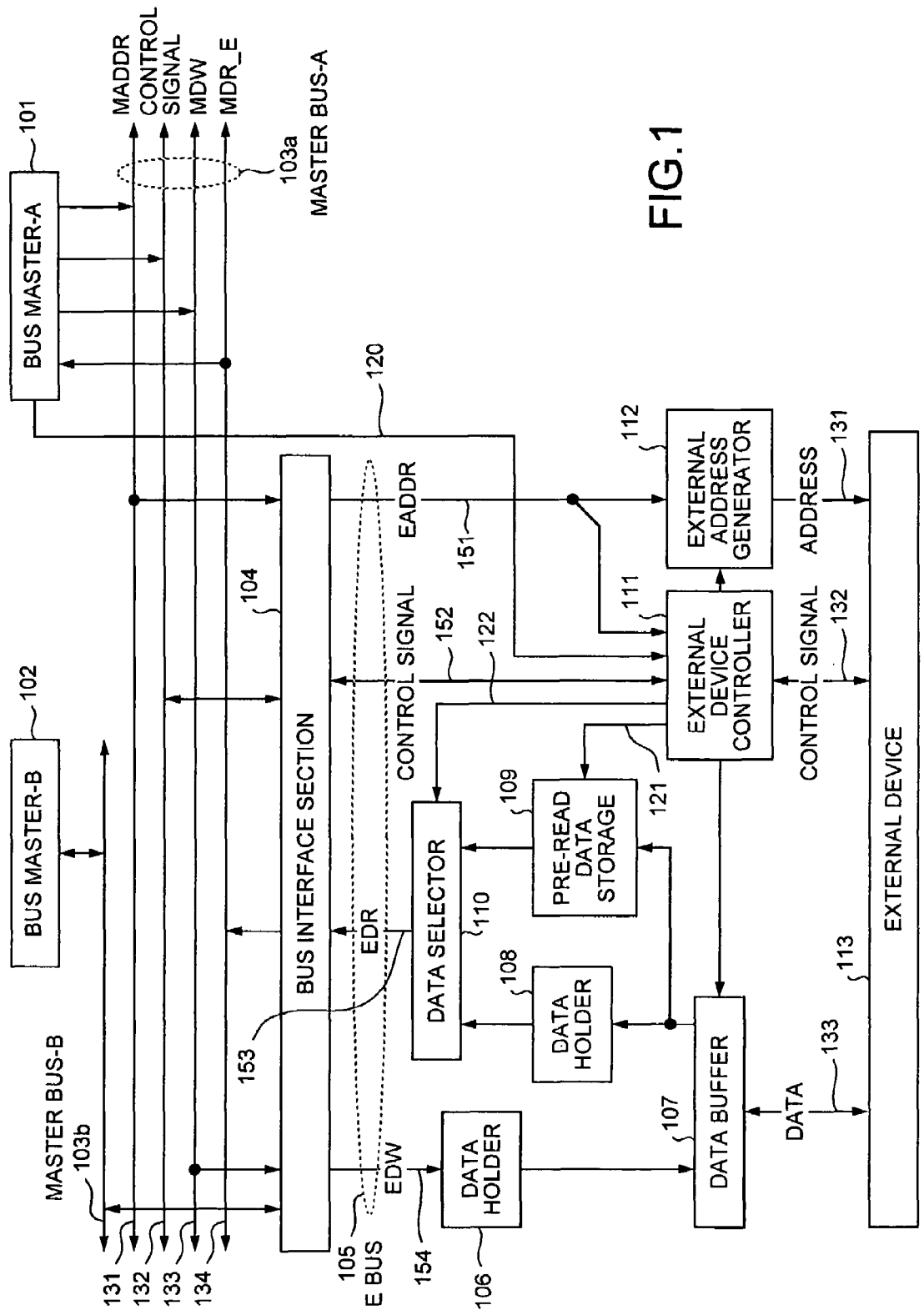
FIG. 1 is a block diagram of a data transfer control circuit in a system LSI according to a first embodiment of the present invention.

FIG. 1 is a block diagram of the data transfer control circuit in a system LSI according to a first embodiment of the present invention. Two bus masters, bus master-A 101 and bus master-B 102, are shown here.

The bus master-A 101 generates a data pre-read instruction signal 120, in addition to its conventional bus access function. The conventional bus access function of the bus master-A 101 includes controlling a master bus-A 103*a* to access a not shown CPU or an external device 113. The bus master-B 102 has the conventional bus access function. The conventional bus access function of the bus master-B 102 includes controlling a master bus-B 103*b* to access the CPU or the external device 113.

The master bus-A 103*a* and the master bus-B 103*b* have the same configuration. The master bus-A 103*a*, for example, includes an address signal bus 131 from which an address signal MADDR is transmitted, a control signal bus 132 from which a control signal is transmitted, a write data signal bus 133 from which data to be written (hereinafter, "write data") MDW is transmitted, and a read data signal bus 134 from which data read out from the external device 113 (hereinafter, "read data") MDR_E is transmitted.

A bus interface section 104 is connected to the master bus-A 103*a* and the master bus-B 103*b*. The bus interface section 104 performs protocol conversion when accessing the external device 113.

Data holders 106 and 108, a data buffer 107, a pre-read data storage 109, a data selector 110, an external device controller 111, and an external address generator 112 are provided between the bus interface section 104 and the external device 113.

The external address generator 112 is connected to the bus interface section 104 via an address signal bus 151 and to the external device 113 via an address signal bus 131. The external device controller 111 is connected to the bus interface section 104 via a control signal bus 152, and to the external device 113 via a control signal bus 132. The external device controller 111 is input the data pre-read instruction signal 120 from the bus master-A 101, and an address signal EADDR from the address signal bus 151.

A write data input terminal of the data holder 106 is connected to the bus interface section 104 via a write data signal bus 154, and a write data output terminal is connected to a write data input terminal of the data buffer 107. A read and write data input/output terminal of the data buffer 107 is connected to the external device 113 via a data signal bus 133, and read data input terminals of the data holder 108 and the pre-read data storage 109 are respectively connected to the read data output terminal thereof.

The data buffer 107 fetches the write data signal held by the data holder 106 and outputs the signal to the external device 113 under control of the external device controller 111, and fetches the read data signal output from the external device 113 and allows the signal to be held by the data holder 108 and the pre-read data storage 109. The pre-read data storage 109 fetches the read data signal output from the data buffer 107 according to a pre-read data memory control signal 121 from the external device controller 111.

The read data output terminals of the data holder 108 and the pre-read data storage 109 are respectively connected to the data input terminal of the data selector 110. The data output terminal of the data selector 110 is connected to the bus interface section 104 via a read data signal bus 153. The data selector 110 takes out the read data from one of the data holder 108 and the pre-read data storage 109 according to the data selection control signal 122 and transmits the read data to the read data signal bus 153.

The external device 113 is for example a synchronous DRAM (SDRAM). The external address generator 112 generates an address signal of the external device 113 under control of the external device controller 111.

The data read operation for reading out the data from the external device, which is performed in the data transfer control circuit in a system LSI configured as described above is explained. The explanation for the data write operation for writing the data in the external device is omitted.

The whole of the address signal bus 151 through which the address signal EADDR is transmitted, the control signal but 152 through which the control signal is transmitted, the read data signal bus 153 through which the read data signal EDR is transmitted, and the write data signal bus 154 through which the write data signal EDW is transmitted is referred to as E bus 105. It is also assumed that the signals transmitted to the respective buses are specified, using names of E bus address signal, E bus control signal, and E bus read data signal, respectively.

The whole of the address signal bus 131 between the external address generator 112 and the external device 113, the control signal bus 132 between the external device controller 111 and the external device 113, and the data signal bus 133 between the data buffer 107 and the external device 113 is referred to as an external bus. The signals transmitted to the respective buses are specified by using names of an external bus address signal, an external bus control signal, and external bus read data signal.

In the data read operation for the bus master-A 101 to read out the data from the SDRAM that is the external device 113, the bus master-A 101 outputs a control signal necessary for performing data read to the control signal bus 132. Moreover, the address signal of the external device 113 to be read is output to the address signal bus 131. The bus master-A 101 also provides the data pre-read instruction signal 120 to the external device controller 111, as required. For example, when continuous areas in the SDRAM are accessed intermittently, and if there is data expected to be accessed later, or there is data expected to become necessary later, the bus master-A 101 generates the data pre-read instruction signal 120.

When the control signal for data read is output to the control signal bus 132, the bus interface section 104 confirms whether the address signal MADDR on the address signal bus 131 is the address signal to the external device 113. In this example, the address signal MADDR on the address signal bus 131 is an address signal to the external device 113, and hence the bus interface section 104 performs read operation for reading data from the external device 113 with respect to the E bus 905.

That is, the bus interface section 104 outputs the E bus control signal necessary for reading the external device 113 to the control signal bus 152, and at the same time, also outputs the E bus address signal EADDR for accessing the external device 113 to the address signal bus 151.

The external device controller 111 receives the E bus control signal from the control signal bus 152, generates an external bus control signal necessary for accessing the external device 113, and outputs the signal to the external device 113, and at the same time, also instructs the external device generator 112 to generate an address. Further, the external device controller 111 instructs the data buffer 107 to fetch the external bus read data signal.

When having received the E bus control signal from the control signal bus 152, the external device controller 111 confirms whether the data pre-read instruction signal 120 has been input from the bus master-A 101. When the bus master-A 101 requests read access accompanied with the data pre-read instruction signal 120, but at the same time, the bus master-B 102 also requests read access, the read access of the bus master-B 102 is preferentially executed, and thereafter, the read access of the bus master-A 101 (pre-read of data) is executed.

When executing pre-read of data, the external device controller 111 monitors the address to be accessed based on the address signal EADDR on the address signal bus 151, and issues an instruction for generating the address to be used for the second read access to the external address generator 112, by incrementing or decrementing the address used for the first read access. The external device controller 111 also outputs the pre-read data memory control signal 121 to the pre-read data storage 109. At the same time, the external device controller 111 outputs the data selection control signal 122 for selecting the output of the pre-read data storage 109 to the data selector 110.

When having received the E bus address signal EADDR from the bus interface section 104 in accordance with the instruction from the external device controller 111, the external address generator 112 generates an external bus address signal necessary for accessing the external device 113, and outputs the signal to the external device 113.

As a result, the external device 113 performs data read, using the external bus control signal and the external bus address signal. The external bus read data signal output by the external device 113 is input to the data holder 108 via the data buffer 107, and held therein. In the second read access, since the external device controller 111 has generated the pre-read data memory control signal 121, the external bus read data signal output by the external device 113 is input to the pre-read data storage 109 through the data buffer 107 and held therein.

The external device controller 111 finishes the data pre-read operation, if the next access request is not input from the bus master-A 101, even when there is a room in the pre-read data storage 109. Further, the external device controller 111 finishes the data pre-read operation, when the pre-read data storage 109 becomes full with a capacity of for example one data.

The external bus read data signal held by the data holder 108 is transmitted to the read data signal bus 154 as the E bus read data signal EDR through the data selector 110, and thereafter, the external bus read data signal held in the pre-read data storage 109 is transmitted to the read data signal bus 154 as the E bus read data signal EDR through the data selector 110. These external bus read data signals are transmitted to the read data signal bus 134 in the master bus-A 103a through the bus interface section 104 as the read data signal MDR_E, and fetched by the bus master-A 101.

The timing relation at the time of data read operation is explained, with reference to FIG. 2. FIG. 2 is a timing chart that explains the timing relation at the time of data read operation to be performed in the data transfer control circuit in a system LSI shown in FIG. 1. It is assumed that the external device 113 is an SDRAM.

FIG. 2, illustrates the items for the master bus, the E bus, and the external bus separately. The signals on the master bus include REQ, ACK, END, RW, MADDR, MDR_E, and MDW. REQ, ACK, END, and RW are the control signals to be transmitted onto the control signal bus 132. REQ is a bus access request signal, ACK indicates a bus access permission signal, END is a bus access end signal, and RW is a read/write signal. The other signals MADDR, MDR_E, and MDW have already been described above.

The signals on the E bus include EREQ, EEND, ERW, data pre-read instruction, EADDR, EDR, and EDW. EREQ, EEND, and ERW are the E bus control signals to be transmitted onto the control signal bus 152. EREQ is an E bus access request signal, EEND is a bus access end signal, and ERW is an E bus read/write signal. The other signals, such as data pre-read instruction, EADDR, EDR, and EDW have already been described above.

"Read data switch" corresponds to the data selector 110 that is controlled based on the data selection control signal 122. "Pre-read buffer" corresponds to the pre-read data storage 109 that is controlled based on the pre-read data memory control signal 121.

Figure 11:
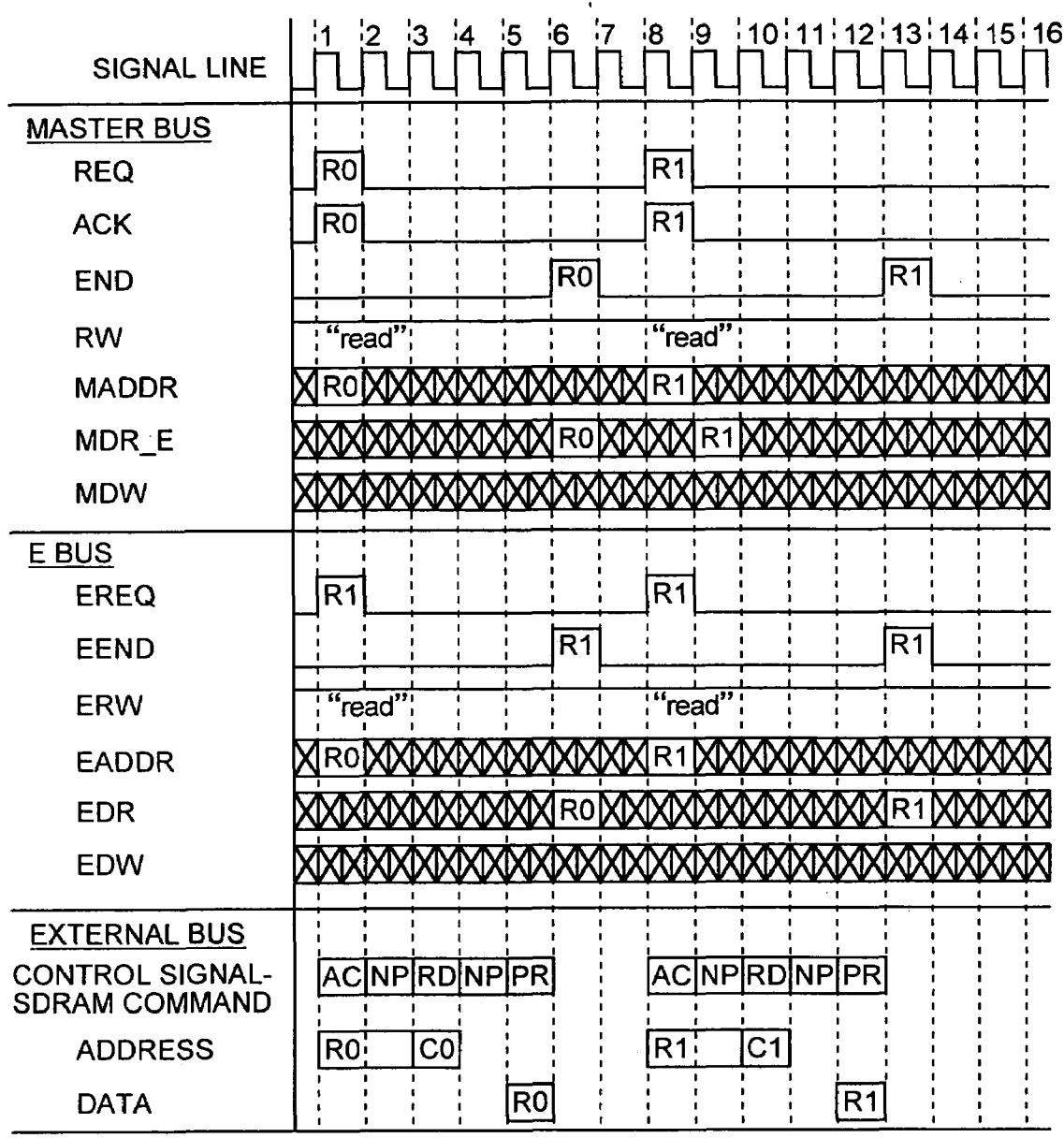
FIG. 11 is a timing chart of a data read operation performed by the conventional data transfer control circuit.

The signals on the external bus include the control signal, the address signal, and the data signal. At the time of data pre-read operation, the control signal includes a line activation command AC, an NOP command NP, and a read command RD. The SDRAM command is defined by the combination of the commands AC, NP, and RD. The bank deactivation command PR shown in FIG. 11 is not used.

Referring to FIG. 2, at clock cycle "1", the bus master-A 101 outputs the bus access request signal REQ "R0", the read/write signal RW, and the address signal MADDR "R0" to the master bus-A 103a. The read/write signal RW has a value "read" indicating that the bus access is the read access.

Upon output of the bus access request signal REQ "R0", the bus interface section 104 reads the address signal MADDR "R0", which is an address of the external device 113, and outputs the bus access permission signal ACK "R0" to the master bus 103a.

Moreover, at clock cycle "1", the bus interface section 104 outputs the E bus access request signal EREQ "R1", the E bus read/write ERW signal, and the E bus address signal EADDR "R0" to the E bus 105. The E bus read/write signal ERW has a value "read" indicating that the E bus access is the read access.

The external device controller 111 receives the E bus access request signal EREQ "R1" from the bus interface section 104, and the "data pre-read instruction" from the bus master-A 101 at the clock cycle "1". As a result, the external device controller 111 outputs the line activation command AC, the NOP command NP, the read command RD, and the read command RD that are the external bus control signals necessary for accessing the SDRAM, to the external device 113 in this order, synchronously to the respective clocks of clock cycles "1" to "4". At clock cycles "5" to "7" thereafter, the external device controller 111 sequentially outputs the NOP command NP.

The external device controller 111 outputs the pre-read data memory control signal 121 to the pre-read data storage 109, since it is the first time to execute the pre-read operation, and outputs the data selection signal 122 for selecting the data holder 108 to the data selector 110. The bank and line in the SDRAM activated by the line activation command AC at clock cycle "1" maintain the activated state thereafter. The external device controller 111 stores the activated bank and line in the SDRAM, and has such a function that if an access different from the activated line of the bank occurs, the external device controller 111 deactivates the activated line of the bank, and activates a line of the bank to be newly accessed.

The external address generator 112 receives the E bus address signal EADDR "R0" from the bus interface section 104, and outputs the external bus address signal necessary for accessing the SDRAM to the external device 113. In this case, the external address generator 112 time-divides the address into a row address "R0" and a column address "C0" and outputs these addresses. Specifically, the external address generator 112 generates the row address "R0" and the column address "C0" from the E bus address signal EADDR according to the external address generation instruction received from the external device controller 111. Then, the external address generator 112 outputs the row address "R0" at clock cycle "1" and the column address "C0" at clock cycle "3". The external address generator 112 then outputs a column address "C1" to be used at the time of next access request, at clock cycle "4".

As a result, since it is assumed that the CAS Latency (Column Address Strobe Latency) of the SDRAM is two clocks, the read data signal "R0" read from the SDRAM by the first read command RD at clock cycle "5" is output to the data buffer 107. The read data signal "R1" read from the SDRAM by the second read command RD at clock cycle "6" is output to the data buffer 107.

The read data signal "R0" read at clock cycle "5" is input to the data holder 108 through the data buffer 107 at clock cycle "6" and temporarily held therein, and is output to the read data signal bus 153 as the E bus read data signal EDR "R0" from the data selector 110. The E bus read data signal EDR "R0" is output to the read data signal bus 134' as a read data signal MDR_E "R0" through the bus interface section 104 at the same clock cycle "6".

At this time, the bus interface section 104 outputs the bus access end signal END "R0" to the control signal bus 132 at the same clock cycle "6". The bus master-A 101 reads this bus access end signal END "R0", and fetches the read data signal MDR_E "R0" from the read data signal bus 134. The bus interface section 104 outputs the E bus access end signal EEND "R1" to the external device controller 111 at the same clock cycle "6".

On the other hand, the read data signal "R1" read at clock cycle "6" is input to the pre-read data storage 109 through the data buffer 107 at clock cycle "7", and temporarily held therein.

The bus master-A 101 then outputs the bus access request signal REQ "R1", the read/write signal RW, and the address signal MADDR "R1" to the master bus 103a at clock cycle "8". To the read/write signal RW, a value "read" indicating that the bus access is the read access is output.

When the bus access request signal REQ "R1" is output, the bus interface section 104 reads the address signal MADDR "R1" to judge that it is an address with respect to the external device 113, and outputs the bus access permission signal ACK "R1" to the control signal bus 132.

At the same time, the bus interface section 104 outputs the E bus access request signal EREQ "R1", the E bus read/write ERW signal, and the E bus address signal EADDR "R1" to the E bus 105. To the E bus read/write signal ERW, a value "read" indicating that the E bus access is the read access is output.

The external device controller 111 receives the E bus access request signal EREQ "R1" from the bus interface section 104, and also receives the "pre-read instruction" from the bus master-A 101 at the same clock cycle "8". Therefore, the external device controller 111 allows the data selector 110 to select the pre-read data storage 109 at clock cycle "9" (read data switch), and outputs the pre-read data memory control signal 121 to the pre-read data storage 109.

As a result, the read data signal "R1" held in the pre-read data storage 109 is output to the read data signal bus 153 as the E bus read data signal EDR "R1" from the data selector 110 at clock cycle "9". The E bus read data signal EDR "R1" is output to the read data signal bus 134 in the master bus-A 103a as the read data signal MDR_E "R1" through the bus interface section 104 at the same clock cycle "9".

At this time, the bus interface section 104 outputs the bus access end signal END "R1" to the control signal bus 132 in the master bus-A 103a at the same clock cycle "9". The bus master-A 101 reads the bus access end signal END "R1" to fetch the read data signal MDR_E "R1" from the read data signal bus 134 in the master bus-A 103a. The bus interface section 104 outputs the E bus access end signal EEND "R1" to the external device controller 111 at the same clock cycle "9".

On the other hand, when having received the E bus access request signal EREQ "R1" from the bus interface section 104 at clock cycle "8", the external device controller 111 outputs the read command RD to the external device 113 at the same clock cycle "8". At clock cycles "9" to "15" thereafter, the external device controller 111 outputs the NOP command NP sequentially.

The data read from the SDRAM by the read command RD issued at this clock cycle "8" is output to the data buffer 107 as the read data "R2" at clock cycle "10". The read data "R2" is then input to the pre-read data storage 109 at clock cycle "11" and held therein.

According to the first embodiment, as explained above, data can be pre-read. Accordingly, when the bus access is to be performed twice as in the conventional example, for the first time, it requires six clock cycles (clock cycle "1" to "6") in the same as in the conventional example, but for the second time, only two clock cycles (clock cycle "8" to "9") are necessary. As a result, according to the first embodiment, the access cycle can be considerably reduced.

An example in which the bus master performs one data access is explained above, but the similar effect can be obtained even when the bus master performs continuous access for a plurality of data (for example, a burst access for four data).

Further, in a device in which only the first access takes time for the same line, like the SDRAM, if the line is temporarily activated, some data in the line can be read, and hence the access cycle can be reduced similarly.

For example in FIG. 1, the data pre-read operation requested by the bus master-A 101 is conducted when there is no access request from the bus master-B 102, which does not output the data pre-read instruction signal. Therefore, when the bus master-A 101 intermittently performs continuous access to the address, the data in the next address can be pre-read and held, if the bus is not congested, after the bus master-A 101 has accessed to an address. The temporarily held data can be accessed from the bus master-A 101 with a short number of clocks, and hence, when an access is performed when the bus is congested, there is the effect that the congestion of the bus can be alleviated.

Figure 3:
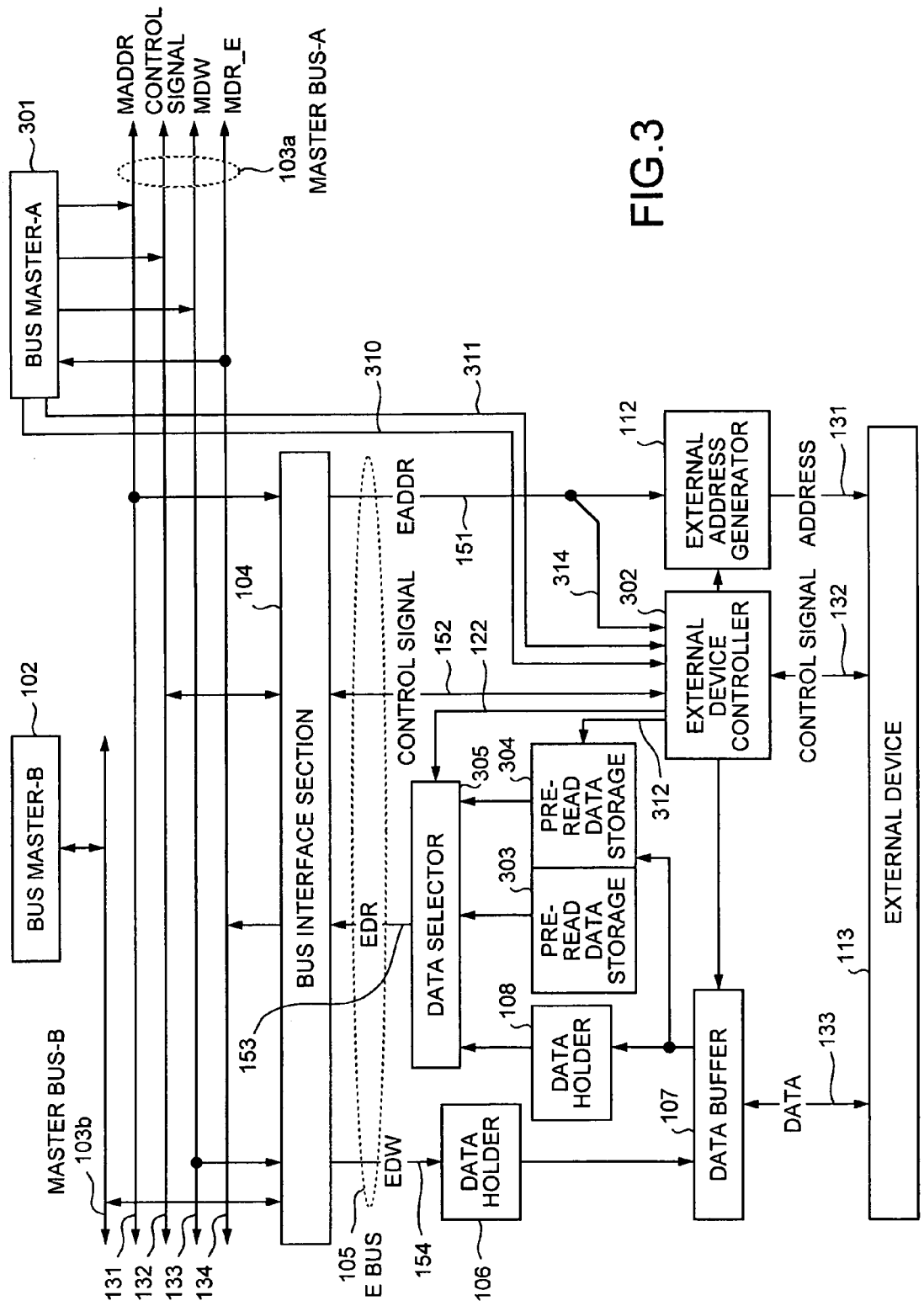
FIG. 3 is a block diagram of a data transfer control circuit in a system LSI according to a second embodiment of the present invention.

FIG. 3 is a block diagram of the data transfer control circuit in a system LSI according to a second embodiment of the present invention. In FIG. 3, the same or equal constituents as those of shown in FIG. 1 are denoted by the same reference signs. Moreover, the portion characteristic to the second embodiment will only be explained here.

This data transfer control circuit includes a bus master-A 301, an external device controller 302, pre-read data storages 303 and 304, and a data selector 305.

The bus master-A 301 outputs data pre-read instruction signals 310 and 311 to the external device controller 302. The pre-read data storages 303 and 304 correspond to bank 0 and bank 1 in the SDRAM, respectively. Thus, the second embodiment is characterized in that the SDRAM has a two-bank configuration, that is, there are two different address areas.

The external device controller 302 is input with an address signal 314 indicating an SDRAM bank address in the E bus address signal bus 151 (hereinafter, "SDRAM bank address signal"). The external device controller 302 issues a pre-read data memory control signal 312 for controlling the pre-read data storages 303 and 304.

The data selector 305 receives a data selection signal 122 from the external device controller 302, selects either one output from the data holder 108 and the pre-read data storages 303 and 304, and transmits the output to the E bus read data bus 153.

The data read operation for the bus master-A 301 to read data from the external device 113 in this data transfer control circuit will now be explained below.

The bus master-A 301 outputs a control signal necessary for performing data read to the control signal bus 132, and an address of the external device 113 to be read to the address signal bus 131. At the same time, the bus master-A 301 outputs a data pre-read instruction signal 310 to the external device controller 302.

In the bus interface section 104 and the E bus 105, the operations explained in the first embodiment are performed, and the data read from the external device 113 is fetched by the bus master-A 301.

After having performed the read access, if the next access request is not issued, the external device controller 302 issues an instruction to the external address generator 112 based on the SDRAM bank address signal 314 in the same manner as in the first embodiment, so that the next address is generated by incrementing or decrementing the address used in the first access. The external device controller 302 controls the read access of the external device 113 by this address. The read data is held in the pre-read data storage 303.

The external device controller 302 finishes the data pre-read operation, if the next access request is not input from the bus master-A 301, even when there is a room in the pre-read data storage 303, as explained in the first embodiment. Further, the external device controller 302 finishes the data pre-read operation, when the pre-read data storage 303 becomes full with a capacity of for example one data.

The external device controller 302 performs the same operation, when a read access accompanied with an output of the data pre-read instruction signal 311 from the bus master-A 301 occurs. That is, the external device controller 302 performs data read from the external device 113, calculation of the next address, and readout of the external device 113 by using the calculated address. At this time, the data read at the calculated address (next address) is held in the pre-read data storage 304.

When a read access accompanied with an output of the data pre-read instruction signal 310 from the bus master-A 301 occurs, the external device controller 302 uses the data selection signal 122 so that the data selector 305 can select the output of the pre-read data storage 303. As a result, the data pre-read from the external device 113 and held in the pre-read data storage 303 is selected by the data selector 305 and fetched by the bus master-A 301.

Similarly, when a read access accompanied with an output of the data pre-read instruction signal 311 from the bus master-A 301 occurs, the external device controller 302 uses the data selection signal 122 so that the data selector 305 can select the output of the pre-read data storage 304. As a result, the data pre-read from the external device 113 and held in the pre-read data storage 304 is selected by the data selector 305 and fetched by the bus master-A 301.

According to the second embodiment, since the next data is read, when the bus for accessing the external device is unoccupied, the bus use efficiency and the data read response can be improved. Even when the bus master alternately accesses different address areas in the external device, since pre-read is possible, the bus use efficiency can be further improved.

Figure 4:
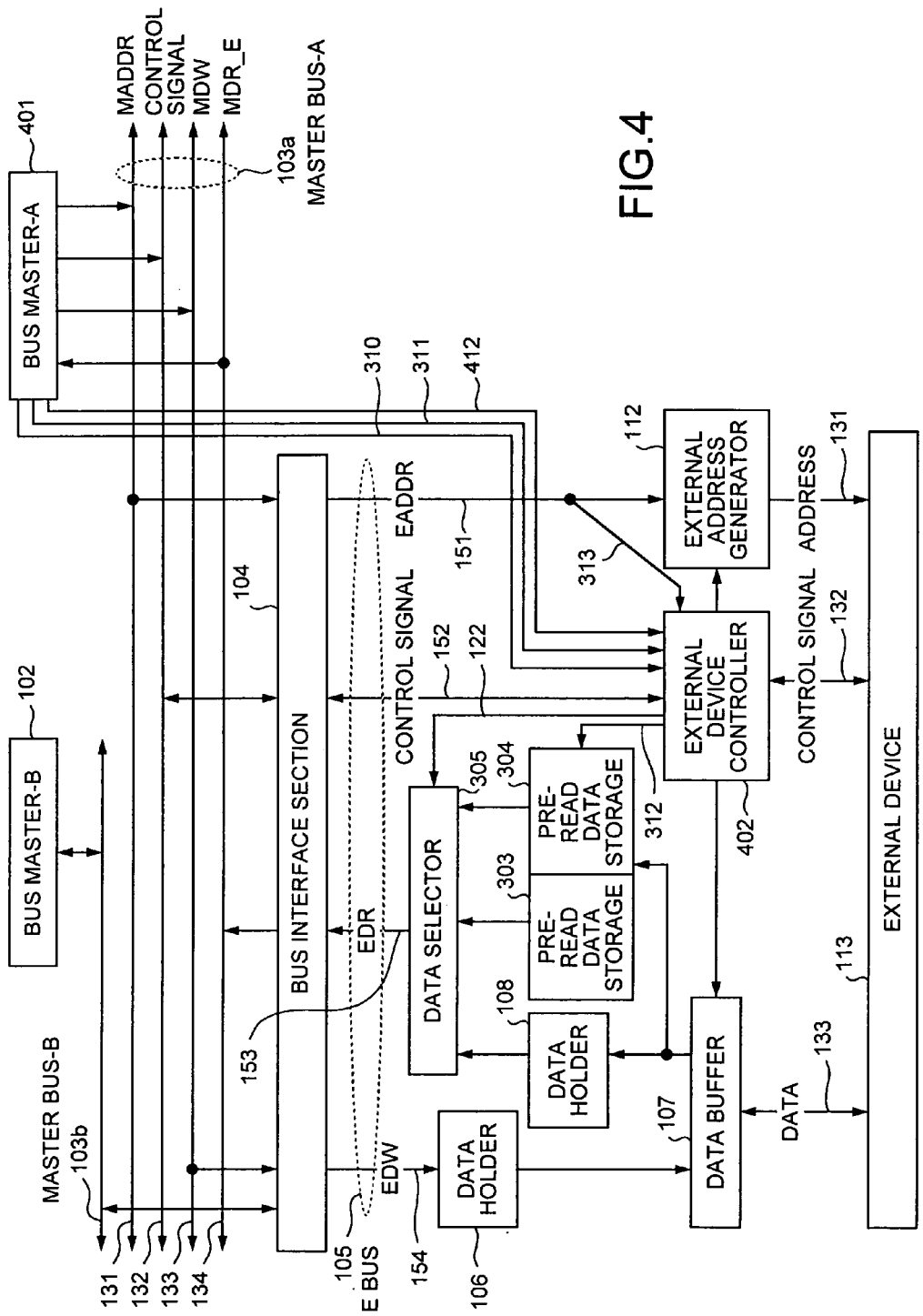
FIG. 4 is a block diagram of a data transfer control circuit in a system LSI according to a third embodiment of the present invention.

FIG. 4 is a block diagram of the data transfer control circuit in a system LSI according to a third embodiment of the present invention. In FIG. 4, the same or equal constituents as those of shown in FIG. 3 are denoted by the same reference signs. The portion characteristic to the third embodiment will only be explained here.

This data transfer control circuit includes a bus master-A 401, and an external device controller 402.

The bus master-A 401 outputs an address direction instruction signal 412, in addition to the data pre-read instruction signals 310 and 311, to the external device controller 402.

When the data pre-read instruction signal 310 or 311 is output, if the address direction instruction signal 412 instructs an incremental direction, the external device controller 402 issues an instruction to generate the next address by incrementing the address output by the bus master-A 401, to the external address generator 112.

On the contrary, when the data pre-read instruction signal 310 or 311 is output, if the address direction instruction signal 412 instructs a decremental direction, the external device controller 402 issues an instruction to generate the next address by decrementing the address output by the bus master-A 401, to the external address generator 112.

In the third embodiment, the normal data read operation and the pre-read operation of the next address data, which are performed by the bus master-A 401 with respect to the external device 113, are performed in the same manner as in the second embodiment. Therefore, effects similar to those in the second embodiment can be obtained.

In addition, according to the third embodiment, it is possible to perform data pre-read in the incremental direction of the address or to perform data pre-read in the decremental direction of the address, in the respective address areas, when the bus master can alternately access different address areas in the external device. As a result, there is the effect that the pre-read operation for the external device access can be flexibly performed.

Figure 5:
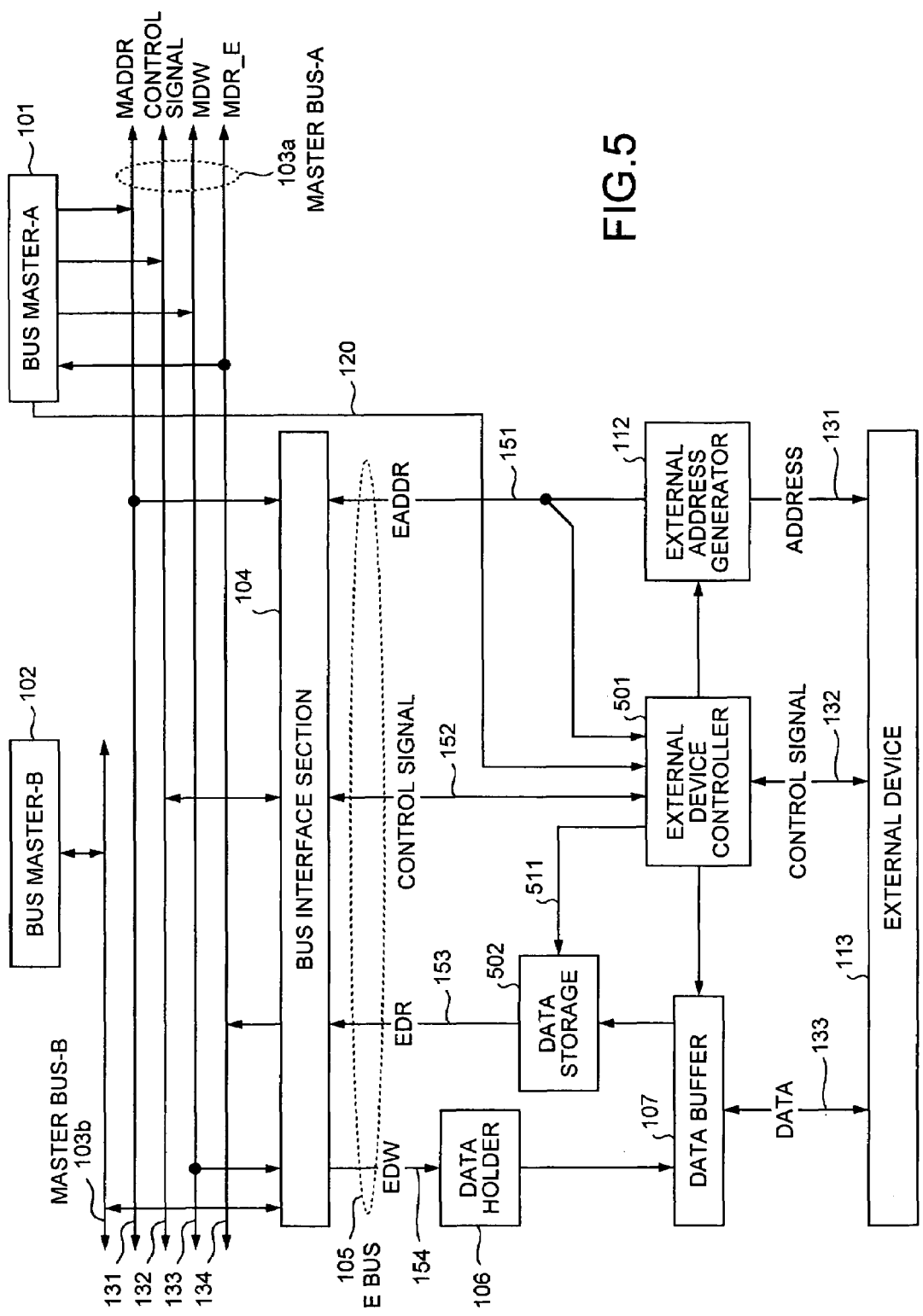
FIG. 5 is a block diagram of a data transfer control circuit in a system LSI according to a fourth embodiment of the present invention.

FIG. 5 is a block diagram of the data transfer control circuit in a system LSI according to a fourth embodiment of the present invention. In FIG. 5, the same or equal constituents as those of shown in FIG. 1 are denoted by the same reference signs. The portion characteristic to the fourth embodiment will only be explained here.

This data transfer control circuit includes an external device controller 501, a data storage 502. Moreover, the data selector shown in FIG. 1 is not 110 provided.

In the fourth embodiment, the normal data read operation and the pre-read operation of the next address data, which are performed by the bus master-A 101 with respect to the external device 113, are performed in the same manner as in the first embodiment. At this time, the normal read data and the pre-read data are obtained at clock cycles "5" and "6", as shown in FIG. 2, and are not read at the same time.

Therefore, in the fourth embodiment, one data storage 502 serves as the data holder 108 and the pre-read data storage 109 shown in FIG. 1, and the external device controller 501 outputs a holding control signal 511, which allows the data storage 502 to hold the normal read data and the pre-read data, to the data storage 502 based on the address signal EADDR on the E bus address signal bus 151.

The data selector 110 is not necessary in this configuration, and the external device controller 501 outputs the holding control signal 511 to the data storage 502 in response to a read request from the bus master-A 101, to control such that the held data is transmitted to the E bus read data bus 153.

According to the fourth embodiment, the same effect as that of the first embodiment can be obtained, and further, the hardware volume and power consumption can be reduced.

Figure 6:
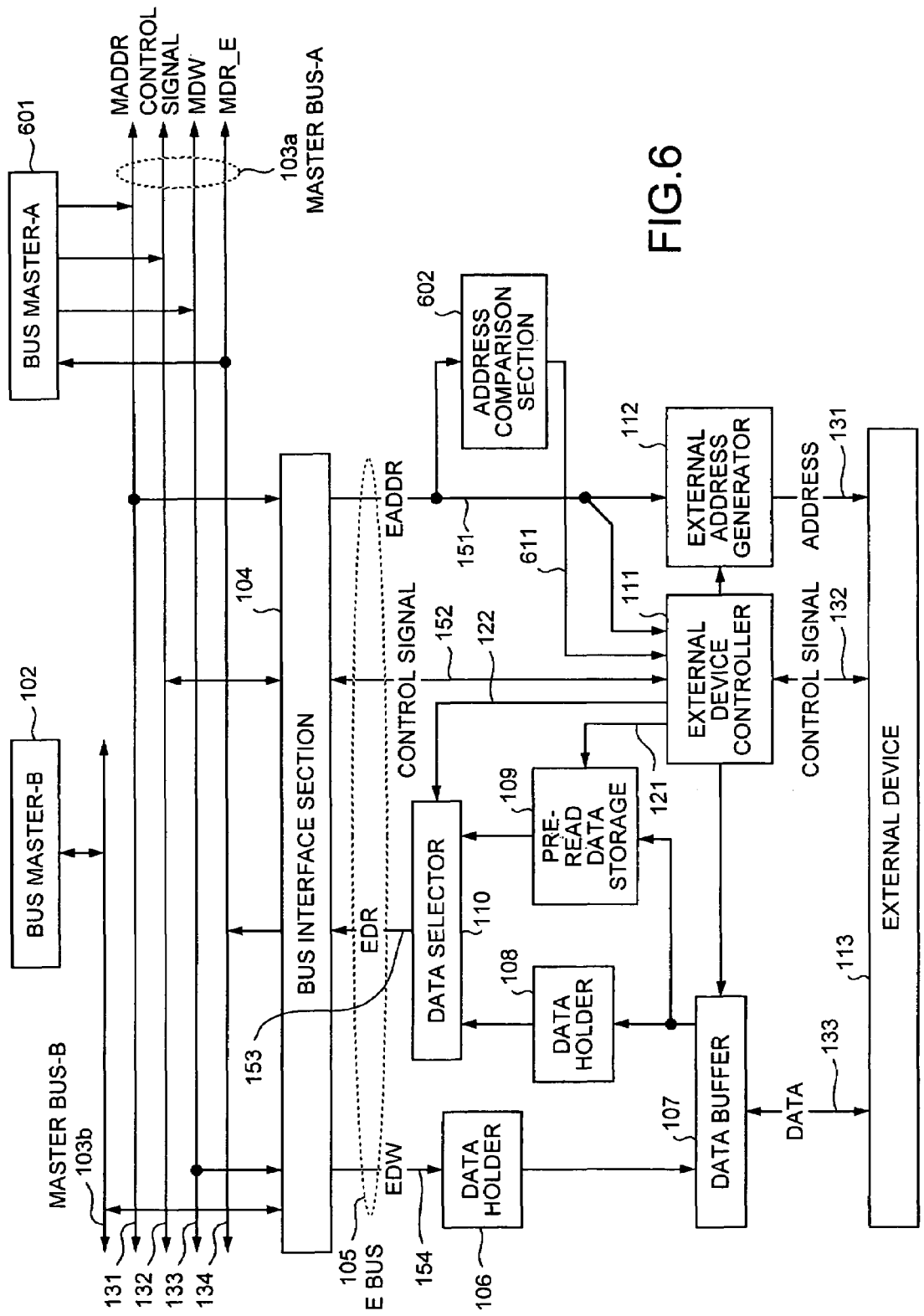
FIG. 6 is a block diagram of a data transfer control circuit in a system LSI according to a fifth embodiment of the present invention.

FIG. 6 is a block diagram of the data transfer control circuit in a system LSI according to a fifth embodiment of the present invention. In FIG. 6, the same or equal constituents as those of shown in FIG. 1 are denoted by the same reference signs. The portion characteristic to the fifth embodiment is will only be explained here.

This data transfer control circuit includes a bus master-A 601 and an address comparison section 602.

The bus master-A 601 has only the conventional bus access function, like the bus master-B 102. The address comparison section 602 generates a data pre-read instruction signal 611 having the equal function as the data pre-read instruction signal 120 in FIG. 1, from the address signal EADDR on the E bus address signal bus 151. This data pre-read instruction signal 611 is supplied to the external device controller 111.

As a result, in the fifth embodiment, the normal data read operation to the external device 113 and the pre-read operation of the next address data can be performed in the same manner as in the first embodiment. Therefore, the generation operation of the data pre-read instruction signal 611 performed in the address comparison section 602 is explained here.

Figure 7:
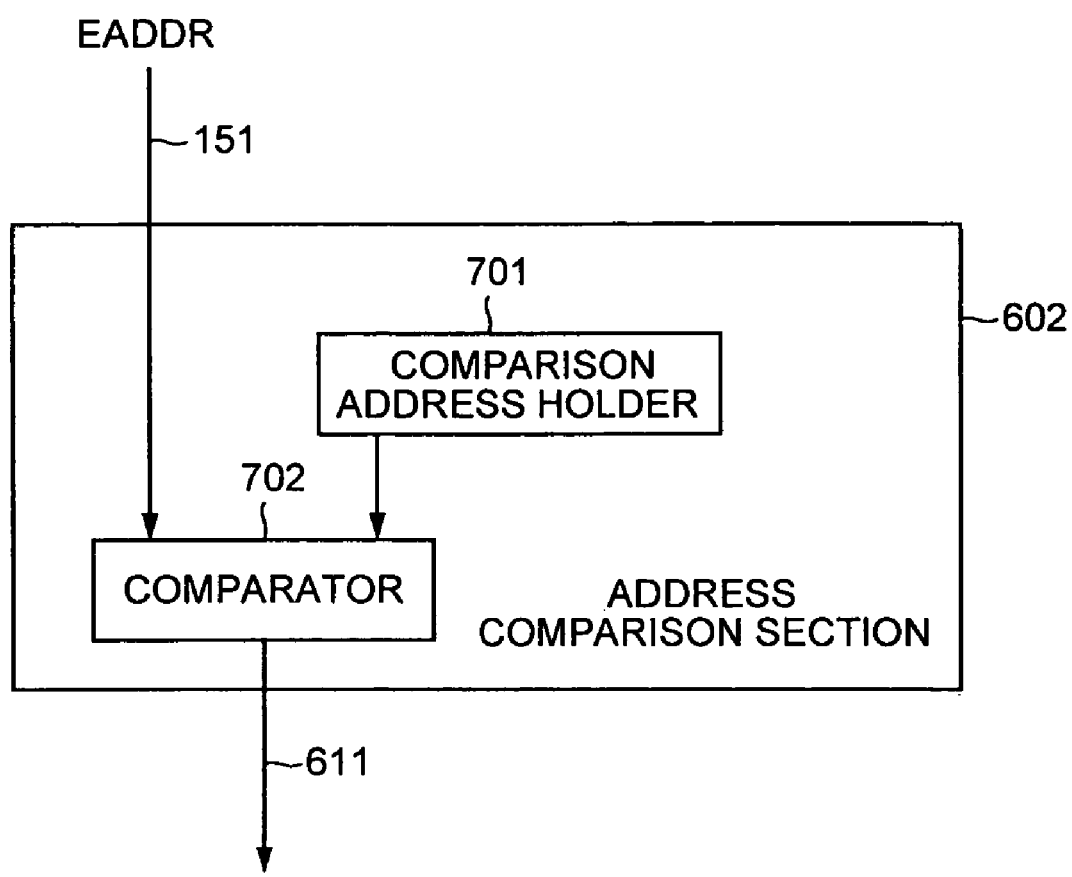
FIG. 7 is a block diagram of an address comparison section of the data transfer control circuit according to the fifth embodiment.

FIG. 7 is a block diagram of the address comparison section 602 shown in FIG. 6. The address comparison section 602 includes a comparison address holder 701 and a comparator 702.

The bus master-A 601 writes an address value in the comparison address holder 701 prior to performing the data read operation with respect to the external device 113. The comparator 702 compares the address value written in the comparison address holder 701 and the E bus address signal EADDR on the E bus address signal bus 151, and generates a data pre-read instruction signal 611, when the both agree with each other.

When the bus master-A 601 performs data read operation, and if the data pre-read instruction signal 611 has been input, the external device controller 111 performs the normal read operation, and then performs the data pre-read operation, as explained in the first embodiment.

According to the fifth embodiment, the data pre-read operation only for the address area intended by a user can be performed, without using a special bus master used in the first embodiment. Therefore, the same effect as in the first embodiment can be obtained, and there is also the effect that an existing circuit can be re-used at the time of designing a new LSI.

Figure 8:
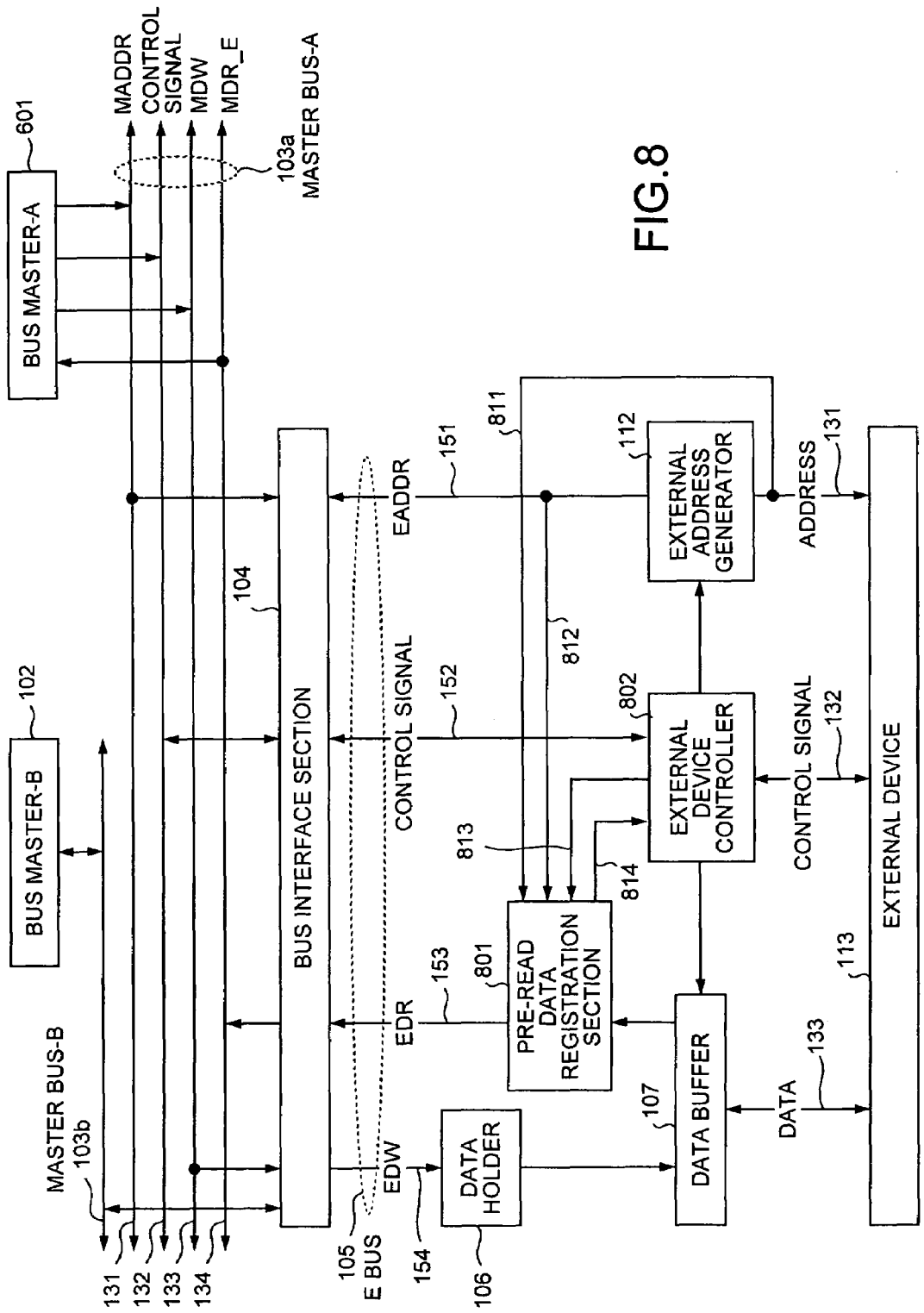
FIG. 8 is a block diagram of a data transfer control circuit in a system LSI according to a sixth embodiment of the present invention.

FIG. 8 is a block diagram of the data transfer control circuit in a system LSI according to a sixth embodiment of the present invention. In FIG. 8, the same or equal constituents as those of shown in FIG. 1 are denoted by the same reference signs. The portion characteristic to the sixth embodiment will only be explained here.

This data transfer control circuit includes a bus master-A 601, an external device controller 802, a pre-read data registration section 801. Moreover, the data selector 110 is not provided.

Figure 9A:
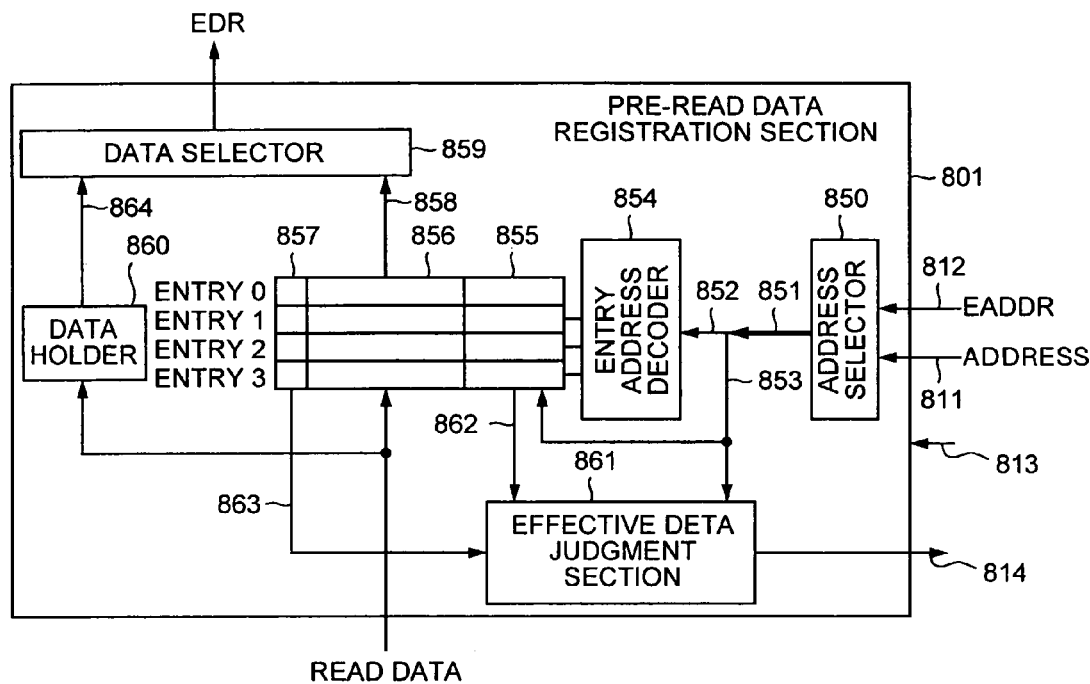
FIG. 9A is a block diagram of a pre-read data registration section of the data transfer control circuit according to the sixth embodiment.
Figure 9B:
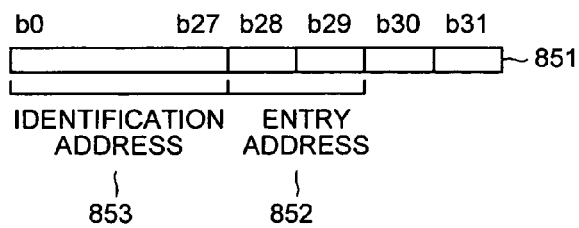
FIG. 9B illustrates a configuration of an address.
Figure 10:
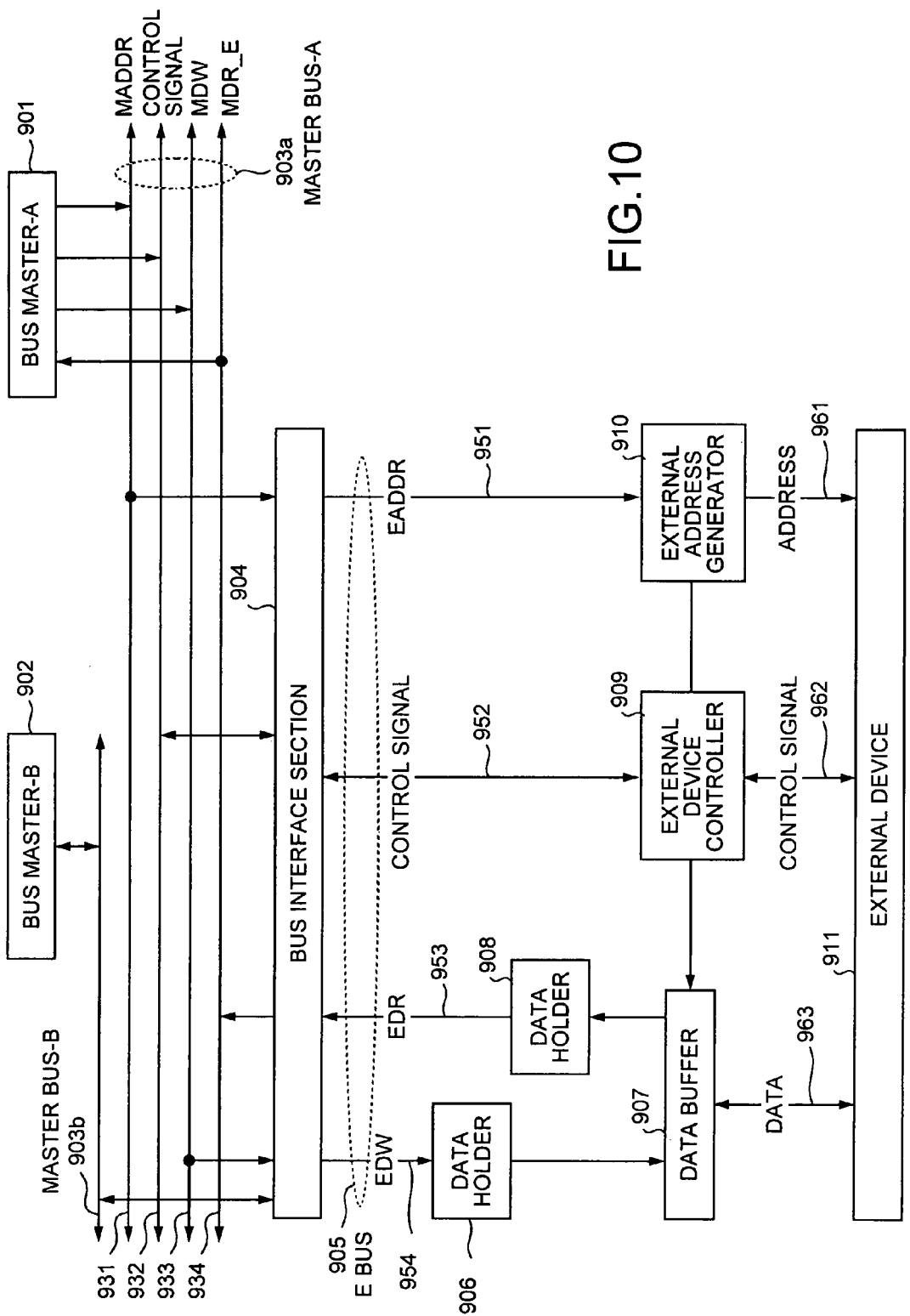
FIG. 10 is a block diagram of a conventional data transfer control circuit in a conventional system LSI.

The bus master-A 601 has only the conventional bus access function, like the bus master-B 102. The pre-read data registration section 801 is constructed so as to be able to register a plurality of pre-read data, for example as shown in FIGS. 9A and 9B. An E bus address signal (EADDR) 812 on the E bus address signal bus 151, an external bus address signal 811 generated by the external address generator 112, and an instruction signal 813 generated by the external device controller 802 are input thereto. The pre-read data registration section 801 outputs an effective data judgment signal 814 to the external device controller 802.

In the sixth embodiment, one pre-read data registration section 801 serves as the data holder 108 and the pre-read data storage 109 shown in FIG. 1, as in the fourth embodiment, but the E bus address signal EADDR on the E bus address signal bus 151 is not input to the external device controller 802. Different from the fourth embodiment, the bus master-A 601 does not have a function of generating the data pre-read signal.

Therefore, in the sixth embodiment, the external device controller 802 judges whether to perform the data pre-read operation according to a value written in a register therein. When there is a data read request from the bus master-A 601, and when the external device controller 802 judges to perform the data pre-read operation, the external device controller 802 generates an address generation instruction, so that the external address generator 112 sequentially generates a plurality of addresses for performing pre-read. Provided that the other bus master-B 102 excluding the bus master-A 601 that has issued the data read request has not issued a data read request, the external device controller 802 performs control so that readout by the pre-read addresses is sequentially executed, and the pre-read data is held in the pre-read data registration section 801.

Thereafter, when there is a data read request from the bus master-A 601, the external device controller 802 generates an instruction signal 813, to enquire if there is any registration in the pre-read data registration section 801, and when the effective data judgment signal 814 from the pre-read data registration section 801 indicates "there is a registration", allows the held data in the pre-read data registration section 801 to be transmitted to the E bus read data bus 153. On the other hand, when the effective data judgment signal 814 from the pre-read data registration section 801 indicates "there is no registration", the external device controller 802 controls so that the external address generator 112 generates an address for performing normal readout to read new data, and the normal readout data is transmitted to the E bus read data bus 153 through the pre-read data registration section 801.

The details of the pre-read data registration section 801 are described later. The data transmission operation to the E bus read data bus 153 is now explained, with reference to FIG. 8. That is, when the pre-read data is to be held in the pre-read data registration section 801, the external device controller 802 uses the instruction signal 813, to register the pre-read data in the pre-read data registration section 801, using a part of the address of the pre-read data as an identifier. Thereafter, when there is a data read request from the bus master-A 601, the external device controller 802 uses the instruction signal 813 to issue a comparison instruction, which is an enquiry whether there is a registration in the pre-read data registration section 801.

The pre-read data registration section 801 receives the comparison instruction, compares the part of the address from the bus master-A 601 (the E bus address signal 812) and the whole or a part of the addresses registered in the pre-read data registration section 801, and informs the comparison result indicating whether there is one which agrees with each other to the external device controller 802, by using the effective data judgment signal 814.

When the effective data judgment signal 814 indicates that "there is one which agrees with each other", the external device controller 802 allows the data held in the pre-read data registration section 801 to be output to the E bus read data bus 153, by using the instruction signal 813. On the other hand, when the effective data judgment signal 814 indicates that "there is none which agrees with each other", the external device controller 802 newly reads data from the external device 113, and outputs the data to the E bus read data bus 153 via the pre-read data registration section 801.

FIG. 9A is a block diagram of the pre-read data registration section 801, and FIG. 9B is an illustration of the address configuration of the selected address signal shown in FIG. 9A.

Referring to FIG. 9A, the address selector 850 selects either one of the E bus address signal 812 on the E bus address signal bus 151 and the external bus address signal 811 on the external address bus 131 generated by the external address generator 112, and outputs the selection address signal 851. The selection address signal 851 comprises an entry address 852 and an identification address 853. For example, as shown in FIG. 9B, when the E bus address signal bus 151 has a 32-bit (b0 to b31) configuration, the entry address 852 has two bits (b28 to b29), and the identification address 853 has 28 bits (b0 to b27).

The entry address 852 is provided to an entry decoder 854. On the output side of the entry decoder 854 are provided an identification address registration section 855 that registers the identification address 853, a pre-read data registration section 856 that registers the read data (pre-read data) input from the data buffer 107, and an effective bit registration section 857 that registers an effective bit indicating whether effective data and an identification address are registered in the entry, for every four entries (entries 0 to 3).

The entry decoder 854 determines an effective entry from four entries 0 to 3, based on the entry address 852. Other than the identification address 853, the identification address 862 of the entry determined in the identification address registration section 855 and the effective bit 863 of the entry determined in the effective bit registration section 857 are input to the effective data judgment section 861. The effective data judgment section determines whether the effective data has been registered in the pre-read data registration section 856 based on these. The determined result is output as the effective data judgment signal 814 to the external device controller 802.

The pre-read data signal 858 determined in the pre-read data registration section 856 becomes one input of the data selector 859. The data that does not go through the pre-read data registration section 856, of the read data input form the data buffer 107, is temporarily held in the data holder 860, and thereafter becomes the other input of the data selector 859. The data selected by the data selector 859 is transmitted to the E bus read data bus 153 as the E bus read data signal EDR.

The pre-read data registration section 801 receives the instruction signal 813 from the external device controller 802 as the control signal, to perform registration operation of the pre-read data and readout operation of the registered data.

The pre-read data registration section 801 can register up to four pre-read data in the entries 0 to 3. At this time, it is determined in which entry the pre-read data is to be registered, by using the entry address 852 that is a part of the address, as the identifier of the data. The registration operation of the pre-read data into the pre-read data registration section 801 is specifically explained below.

That is, when pre-read of data is carried out from the external device 113, and the read data is output to the data buffer 107 through the external data bus 133, the external bus address signal 811 provided to the external device 113 is input to the address selector 850. Therefore, the address selector 850 selects the external bus address signal 811 at this time, and outputs the signal as the selection address signal 851.

The entry address decoder 854 determines the entry, using the entry address 852 in the selection address signal 851. Here, it is assumed that entry 1 is selected. The signal value on the identification address 853, and the signal value on the external data bus 133 are registered in entry 1 of the identification address registration section 855 and of the pre-read data registration section 856, respectively. Further, the effective bit "1" is set to entry 1 of the effective bit registration section 857. These operations are conducted based on the instruction signal 813 from the external device controller 802.

The readout operation of data registered in the pre-read data registration section 801 is explained next. When the data read operation is performed by the bus master-A 601, the address signal EADDR is output onto the E bus address signal bus 151. Hence, the address selector 850 selects the address signal 812 that is the E bus address signal EADDR, and outputs the signal as the selection address signal 851.

The entry address decoder 854 uses the entry address 852 in the selection address signal 851, to determine the entry. It is assumed that entry 1 is selected here. The entry address decoder 854 then provides the identification address 862 registered in entry 1 of the identification address registration section 855, and the effective bit 863 registered in the effective bit registration section 857 to the effective data judgment section 861.

When the effective bit 863 in entry 1 is "1", and the identification address 862 registered in entry 1 agrees with the identification address 853 of the address to be read now, the effective data judgment section 861 uses the effective data judgment signal 814 to inform the external device controller 802 of the fact that the effective data is registered in the pre-read data registration section 801.

Upon reception of this information, the external device controller 802 uses the instruction signal 813 so that the data selector 859 outputs the pre-read data signal 858 registered in entry 1 of the pre-read data registration section 856. The data selector 859 selects the pre-read data signal 858, to output the signal to the E bus read data bus 153.

On the other hand, when the effective bit 863 in entry 1 is "0", or the identification address 862 registered in entry 1 does not agree with the identification address 853 of the address to be read now, there is no effective data registered in the pre-read data registration section 801. Therefore, the effective data judgment section 861 uses the effective data judgment signal 814 to inform the external device controller 802 of this fact.

Upon reception of this information, the external device controller 802 reads the new normal data from the external device 113, and instructs the data holder 860 to hold the normal data. The external device controller 802 then allows the data selector 859 to select the data holder 860 to output the held data to the E bus read data bus 153.

According to the sixth embodiment, the bus master-A 101 having only the bus access function can obtain the pre-read data as in the fifth embodiment, only by issuing the data read request. Therefore, as in the fifth embodiment, the existing circuit can be re-used at the time of designing a new LSI.

As concretely mentioned in the first embodiment, pre-read of data in this invention is executed when the bus is unoccupied, and hence it is different from a so-called cache in the point that the data is not pre-read when the bus is occupied.

As explained above, according to the present invention, when intermittently accessing continuous addresses in for example an SDRAM that is an external device, after the bus master accesses a certain address, if the bus is unoccupied, the bus master pre-reads and holds the next data, and thereafter, can fetch the held data at an appropriate timing. Therefore, the bus master can pre-read data expected to be accessed later or data expected to become necessary later, when the bus is unoccupied. As a result, overhead in the access to the SDRAM that is the external device, can be dissolved, and concentration in the access to the SDRAM can be avoided.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A data transfer control circuit in a system large-scale integration, which controls data transfer when a plurality of bus masters access a commonly shared external device, wherein
at least one bus master of the bus masters has an arrangement for instructing pre-read of data, at the time of issuing a data read request, the data transfer control the circuit comprising:
an external address generation unit that receives an address generation instruction and generates an address signal of the external device based on an address signal issued by the one bus master;
an external device control unit that makes the external address generation unit to continuously generate an address for normal readout this time and an address for the next pre-read, upon reception of the data read request accompanied with the data pre-read instruction issued by the one bus master, and executes readout based on the next pre-read address, provided that when the normal readout this time is finished, the bus master other than the one bus master has not issued a data read request;
a data holding unit that holds the normal data read based on the normal readout address this time; and
a pre-read data storage unit that stores the pre-read data read based on the next pre-read address.

2. The data transfer control circuit according to claim 1, wherein the one bus master has an arrangement for instructing pre-read of data, respectively, with respect to a plurality of data holding areas, at the time of issuing a data read request,
the pre-read data storage unit is provided for the number of the data pre-read instructions, and
the external device control unit allows the pre-read data read by the next readout address to be held in the pre-read data storage unit corresponding to the data pre-read instruction, upon reception of the data read request from the one bus master.

3. The data transfer control circuit according to claim 1, wherein the one bus master has an arrangement for instructing a method of calculating an address of the data to be pre-read; and
the external device control unit makes the external address generation unit generate the pre-read data address using the method instructed by the one bus master.

4. The data transfer control circuit according to claim 1, wherein the data holding unit and the pre-read data storage unit are a part of a single storage unit.

5. A data transfer control circuit in a system large-scale integration, which controls data transfer when a plurality of bus masters access a commonly shared external device, comprising:
an instruction signal generation unit that generates a data pre-read instruction signal, when an address signal issued by one of the bus masters includes an address determined to be pre-read;
an external address generation unit that receives an address generation instruction and generates an address signal of the external device based on the address signal;
an external device control unit that generates the address generation instruction so that the external address generation unit continuously generates an address for performing normal readout this time and an address for performing pre-read for the next time, when the data read request issued by the one bus master is accompanied with the generation of the data pre-read instruction signal, and executes readout based on the next pre-read address, provided that bus master other than the one bus master has not issued a data read request, when the normal readout this time is finished;
a data holding unit that holds the normal data read based on the normal readout address this time; and
a pre-read data storage unit that stores the pre-read data read based on the next pre-read address.

6. The data transfer control circuit according to claim 5, wherein the data holding unit and the pre-read data storage unit are a part of a single storage unit.

7. A data transfer control circuit in a system large-scale integration, which controls data transfer when a plurality of bus masters access a commonly shared external device, comprising:
an external address generation unit that receives an address generation instruction and generates an address signal of the external device based on the address signal;
an external device control unit that generates the address generation instruction so that the external address generation unit sequentially generates a plurality of addresses for performing pre-read in addition to the address for performing the normal readout, when it judges to execute pre-read of data, upon reception of the data read request issued by the one bus master, sequentially executes readout by the pre-read addresses provided that bus master other than the one bus master has not issued a data read request, and executes readout by the normal readout address upon reception of the normal readout instruction; and
a pre-read data registration unit that registers the pre-read data read by the pre-read addresses identifiably by the address identifiers, and judges whether there is one of the address identifiers that agrees with the address in the address signal accompanying the data read request issued by the one bus master, and when there is one address that this condition, transmits the corresponding registered pre-read data to the one bus master as the readout data this time, and when there is no address that agrees this condition, generates the normal readout instruction to transmit the read normal data to the one bus master as the readout data this time.

* * * * *